May 3, 1949.   A. J. LANDRY   2,468,763
BICYCLE STAND
Filed Aug. 29, 1947
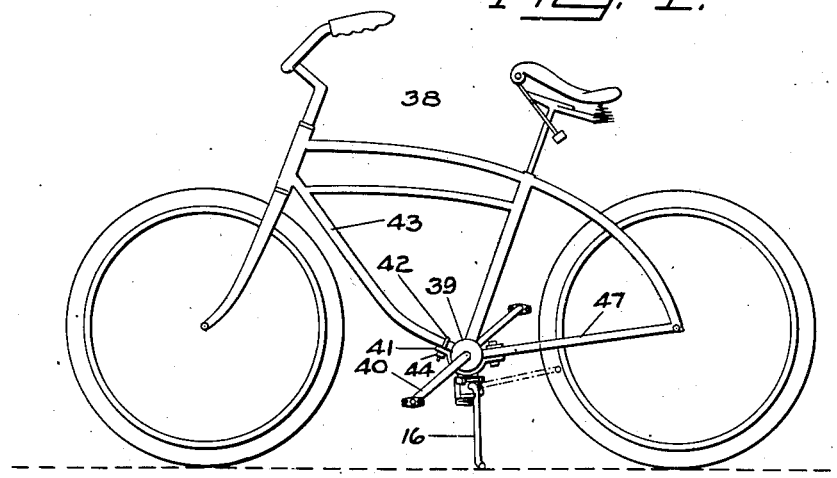
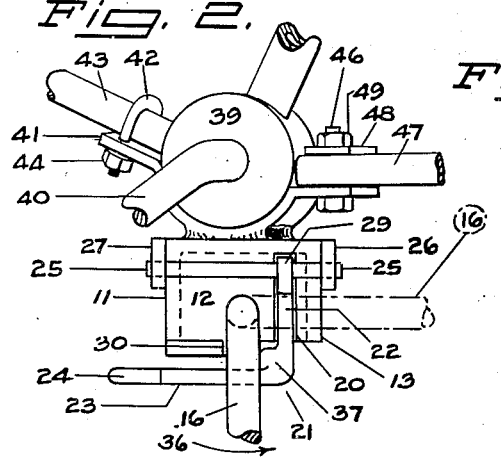
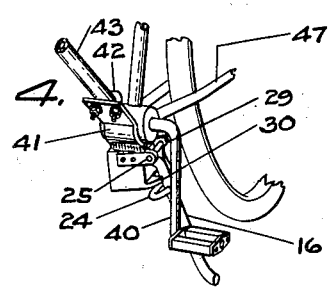
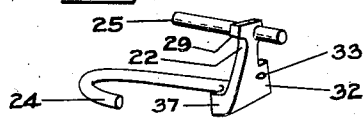
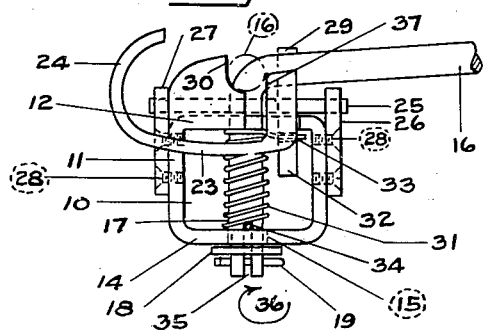
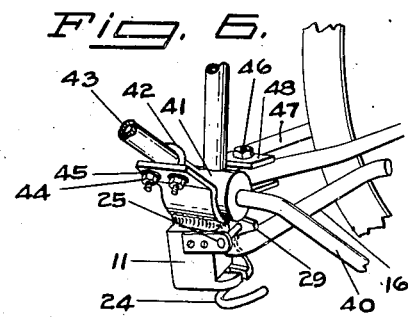
INVENTOR.
AMAURY J. LANDRY
BY
Edward C. Healy
ATTORNEY Patented May 3, 1949

2,468,763

UNITED STATES PATENT OFFICE 2,468,763

BICYCLE STAND

Amaury J. Landry, San Francisco, Calif.

Application August 29, 1947, Serial No. 771,359

3 Claims. (Cl. 280—293)

This invention relates to an improved bicycle stand and particularly relates to a specially constructed attachment for supporting the bicycle when not in use.

Bicycle stands have been used to support the rear wheel thereof and elevate the same from the ground when the bicycle is at rest. One of the disadvantages with such stands resides in the fact that the device must be manually operated to position the stand both in its supporting position and its released position. Another disadvantage in the old types of such stands is the fact that they are not readily attachable to every make of bicycle.

An object of the present invention is to provide an improved stand that will vertically support the bicycle when at rest, which stand will automatically release to a horizontal position when starting to ride the bicycle.

Another object of the present invention is to position the device directly underneath the crank hanger bracket and to provide a specially constructed latch for controlling the vertical and horizontal position of the stand, which latch is capable of being automatically tripped by one of the crank arms of the bicycle, when starting to ride, whereby the stand is automatically released from its vertical supporting position to its folded horizontal position.

A further object of the present invention is to operate, both, the said latch and stand by a single torsion spring, and to provide a specially constructed extremely small casing for supporting the latch, stand and torsion spring, whereby the various parts are easily assembled and dismantled.

A still further object of the present invention is to fix the said casing to a concave bracket that is adapted to be positioned directly beneath and against the crank hanger bracket of the bicycle and to provide means for adjustably securing the said concave bracket to the handle bar down tube and chain stay fork of the bicycle, whereby the device is readily attachable to all standard types of bicycles.

A still further object of the present invention is to provide an improved bicycle stand of the character described that is durable, simple in construction, economical to manufacture, positive in operation and highly efficient and serviceable in use.

Other objects and advantages will be apparent during the course of the following description.

In the accompanying drawing forming a part of the specification, wherein for the purpose of illustration like numerals designate like parts throughout the same, Fig. 1 is a side elevational view of a bicycle and the improved stand positioned thereon.

Fig. 2 is an enlarged side elevational view of the device with a fragment of the stand proper shown in its vertical and supporting position, Fig. 3 is a bottom plan view of the device shown in Fig. 2, with a fragment of the stand proper in its horizontal position, Fig. 4 is a perspective fragmentary view illustrating the principle of the invention, Fig. 5 is a perspective view of the specially constructed latch employed in the invention, and Fig. 6 is a fragmentary view illustrating how the device is secured to the bicycle.

Referring in detail to the drawing and to the numerals thereof, it will be noted that I have provided a suitable frame preferably in the form of a rectangular casing open at the bottom as at 10, and formed with side walls 11, 12, 13 and 14 as shown to advantage in Figs. 2 and 3. The walls 12 and 14 are apertured as at 15 for pivotally supporting the leg 16, which leg is preferably made of a round rod and formed with a bent portion 17 that extends through the said walls and is retained therein by a suitable washer 18 and cotter pin 19 as illustrated in Fig. 3. The wall 12 is slotted as at 20 for accommodating a specially constructed latch designated as a whole by the numeral 21. The said latch is formed with a vertical portion 22 supported in the said slot and a horizontal lever portion 23 that extends below the casing 9 and projects beyond the wall 11 thereof and curves outwardly beyond the wall 12 forming a bumper as at 24. The said latch is provided with a shaft 25 that extends through oppositely disposed ears 26 and 27 on the casing and is pivotally supported therein. The ears are preferably removably secured to the casing by suitable screws 28. The shaft is shown as being integral with the latch but can be removably secured thereto if desired. A stop 29 is provided on the said shaft for limiting the upward movement of the leg 16 and a stop 30 is provided on the casing for limiting the vertical movement of the leg. The said stops can be provided in any suitable manner that will best serve the purpose of the invention.

The means provided for operating the said latch and leg is shown as comprising a coil spring 31 positioned on the bent portion 17 of the leg 16 and within the casing as shown in Fig. 3. The latch is formed with an ear 32 and one end portion of the spring extends through the ear as at 33 and the opposite end portion of the said spring extends in the bent leg portion 17 as at 34. The shaft is preferably slotted as at 35 for receiving the spring. A resilient pressure is thus applied against the latch to force the latch outwardly and a spring torsion is exerted on the bent portion 17 of the leg in direction of the arrow 36 which forces the leg upwardly when released. The outer surface of the vertical portion 22 of the latch slants outwardly toward the bottom as shown to advantage in Fig. 5, providing a stop 37 which retains the leg in its standing position until the latch is moved inwardly, which inward movement releases the leg from stop 37 of the latch.

The bicycle is designated as a whole by the numeral 38, the numeral 39 the crank arm bracket and the numeral 40 one of the crank arms. When the device is in its standing position as illustrated in Fig. 1, the outer curved portion 24 of the latch lever 23 extends in the path in which the said crank arm 40 travels. It will be obvious that when a person starts pedalling the bicycle the crank arm 40 will bump the outer curved portion 24 of the latch lever forcing the latch inwardly, whereby the coil spring 31 will automatically force the leg 16 upwardly to its folded position against the stop 29 as illustrated in dot and dash lines in Figs. 1 and 2. When the leg is in this position it rests against the outer surface of the vertical portion 22 of the latch and holds the latch inwardly, whereby the outer curved portion 24 of the latch lever 23 is retained out of the travelling path of the crank arm 40. When it is desired to stand the bicycle the leg 16 is merely pushed by the hand or foot against the stop 30 as illustrated in Figs. 1 and 2.

A concave bracket 41 adapted to fit the crank arm bracket 39 of the bicycle is fixed to the top of the casing and it will be noted that the said bracket is positioned at an angle thereon. This feature is provided to enable the leg to extend at an angle outwardly when the bicycle is in its standing position and to extend inwardly close to the wheel when the leg is in its upward folded position. A U bolt 42 extends through one end portion of the said concave bracket and around the bicycle down bar tube 43 and is rigidly tightened thereto by suitable nuts 44 having washers 45. A bolt 46 extends through the opposite end portion of the said concave bracket and through the chain stay fork 47 of the bicycle and is secured thereto through the medium of a plate 48 capable of extending across the fork and a nut 49 tightened against the plate. The device can thus be easily secured to any conventional make of bicycle.

It is to be understood that the form of my invention herewith shown and described is to be taken as a preferred example of the same and that various changes relative to the shape, size, material and arrangement of parts may be resorted to without departing from the spirit of the invention or the scope of the subjoined claims.

Having thus described my invention, I claim:

1. In combination with a bicycle, a stand for supporting the same, comprising a frame positioned beneath the crank arm bracket of the bicycle, a spring actuated leg pivotally secured to the frame, means including a spring controlled latch for retaining the leg in an upright position, whereby the bicycle is supported, and means on the latch adapted to be automatically operated by a crank arm of the bicycle, when the bicycle is ridden, whereby the leg is automatically released from its upright position.

2. In combination with a bicycle, a stand for supporting the same, comprising a frame positioned beneath and against the crank arm bracket of the bicycle, means for removably securing the said stand frame to the frame of the bicycle, a spring actuated leg pivotally secured to the stand frame, means for retaining the leg in an upright position, whereby the bicycle is supported, the said last mentioned means including a stop fixed on the stand frame and a spring controlled latch pivotally secured to the stand frame, a lever on the said latch adapted to be abutted by a crank arm of the bicycle, when the bicycle is ridden, whereby the latch is moved inwardly and the leg is automatically released from its upright position.

3. In combination with a bicycle, a stand for supporting the same, comprising a frame positioned beneath and against the crank arm bracket of the bicycle, means for removably securing the said stand frame to the frame of the bicycle, a leg pivotally secured to the stand frame, a coil spring for actuating the said leg, means for retaining the leg in an upright position, whereby the bicycle is supported, the said leg retaining means including a stop integral with the stand frame and a latch pivotally secured to and slidably supported in the stand frame, the said latch being resiliently controlled by the said spring that actuates the leg, a lever on the lower portion of the said latch extending beyond the said frame, the said lever being adapted to be abutted by a crank arm of the bicycle, when the bicycle is ridden, whereby the latch is moved inwardly and the leg is free to move to its inoperative position, and a stop for limiting the movement of the leg to define its inoperative position.

AMAURY J. LANDRY.

REFERENCES CITED

The following references are of record in the file of this patent:

UNITED STATES PATENTS

| Number | Name | Date |
|---|---|---|
| 1,006,125 | Potter | Oct. 17, 1911 |

FOREIGN PATENTS

| Number | Country | Date |
|---|---|---|
| 380,761 | Italy | June 3, 1940 |
| 493,505 | Great Britain | Oct. 10, 1938 |